United States Patent
Baumeister et al.

(10) Patent No.: US 9,482,570 B2
(45) Date of Patent: Nov. 1, 2016

(54) DEVICE AND METHOD FOR RECALIBRATING AN EXHAUST GAS MASS FLOW SENSOR

(71) Applicant: PIERBURG GMBH, Neuss (DE)

(72) Inventors: Lars Baumeister, Nettetal (DE); Karl Wuebbeke, Inden (DE); Dirk Kamarys, Willich (DE)

(73) Assignee: PIERBURG GMBH, Neuss (DE)

( * ) Notice: Subject to any disclaimer, the term of this patent is extended or adjusted under 35 U.S.C. 154(b) by 123 days.

(21) Appl. No.: 14/426,164

(22) PCT Filed: Jul. 16, 2013

(86) PCT No.: PCT/EP2013/064975
§ 371 (c)(1),
(2) Date: Mar. 5, 2015

(87) PCT Pub. No.: WO2014/037138
PCT Pub. Date: Mar. 13, 2014

(65) Prior Publication Data
US 2015/0226596 A1 Aug. 13, 2015

(30) Foreign Application Priority Data

Sep. 7, 2012 (DE) .................. 10 2012 108 350

(51) Int. Cl.
*G01F 1/688* (2006.01)
*G01F 25/00* (2006.01)
(Continued)

(52) U.S. Cl.
CPC .......... *G01F 25/00* (2013.01); *F02D 41/1445* (2013.01); *G01F 1/68* (2013.01);
(Continued)

(58) Field of Classification Search
CPC .......... G01F 1/68; G01F 1/684; G01F 1/688; G01F 1/6888; G01P 5/10; G01P 5/12
See application file for complete search history.

(56) References Cited

U.S. PATENT DOCUMENTS 4,213,335 A * 7/1980 Peter .................. G01F 1/696
73/204.15
4,332,157 A * 6/1982 Zemel .................. G01F 1/6886
310/306

(Continued)

FOREIGN PATENT DOCUMENTS

DE 102005061533 B4 * 12/2007 ............. G01F 1/684
DE 10 2006 058 425 A1 6/2008
(Continued)

*Primary Examiner* — David A Rogers
(74) *Attorney, Agent, or Firm* — Norman B. Thot

(57) ABSTRACT

A device for recalibrating an exhaust gas mass flow sensor includes a first sensor, a second sensor, and a control unit. The first sensor comprises a heating element and a first temperature measuring element. The second sensor comprises a second temperature measuring element. The control unit controls a temperature signal produced at the heating element and comprises a first and second characteristic map. The first characteristic map plots an exhaust gas mass flow as a function of a heat dissipation of the heating element. A correction factor can be determined from the second characteristic map based on the temperature signal produced at the heating element and measured by the first temperature measuring element and based on a temperature signal measured via the heating element at the second temperature measuring element. The correction facture corrects a measured heat dissipation of the unit heating element to a corrected exhaust gas mass flow.

8 Claims, 3 Drawing Sheets

(51) Int. Cl.
  *G01F 1/684* (2006.01)
  *G01F 1/692* (2006.01)
  *G01F 1/696* (2006.01)
  *F02D 41/14* (2006.01)
  *G01F 1/68* (2006.01)
  *G01M 15/10* (2006.01)
  *F02D 41/18* (2006.01)

(52) U.S. Cl.
  CPC .............. *G01F 1/684* (2013.01); *G01F 1/692* (2013.01); *G01F 1/6965* (2013.01); *G01F 25/0007* (2013.01); *G01M 15/10* (2013.01); *F01N 2900/1411* (2013.01); *F02D 41/1494* (2013.01); *F02D 41/187* (2013.01)

(56) References Cited

U.S. PATENT DOCUMENTS

| | | | |
|---|---|---|---|
| 5,477,734 A * | 12/1995 | Zemel | G01P 5/10 73/204.11 |
| 6,631,638 B2 * | 10/2003 | James | G01F 1/6845 73/204.26 |
| 7,165,441 B2 * | 1/2007 | Bauer | G01N 27/18 73/25.03 |
| 7,243,538 B1 * | 7/2007 | Ramsesh | G01F 25/0053 73/204.21 |
| 7,565,836 B2 * | 7/2009 | Sukegawa | G01F 1/696 73/204.15 |
| 7,650,783 B2 * | 1/2010 | Pape | G01F 1/684 73/204.11 |
| 7,726,187 B2 * | 6/2010 | Sukegawa | G01F 1/6983 73/204.27 |
| 2005/0132795 A1 | 6/2005 | Kobayashi et al. | |
| 2007/0144250 A1 * | 6/2007 | Ramsesh | G01F 25/0053 73/204.22 |
| 2009/0299657 A1 | 12/2009 | Mizutani et al. | |
| 2013/0132003 A1 | 5/2013 | Toennesmann et al. | |
| 2015/0020570 A1 | 1/2015 | Wuebbeke et al. | |

FOREIGN PATENT DOCUMENTS

| | | | | |
|---|---|---|---|---|
| DE | 102010054388 A1 * | 11/2011 | | G01F 1/684 |
| DE | 10 2010 033 175 B3 | 12/2011 | | |
| EP | 1 065 475 A2 | 1/2001 | | |
| EP | 1 225 316 A2 | 7/2002 | | |
| JP | 2009-288153 A | 12/2009 | | |
| WO | WO 03/095947 A1 | 11/2003 | | |
| WO | WO 2005/015192 A1 | 2/2005 | | |
| WO | WO 2007/075510 A2 | 7/2007 | | |
| WO | WO 2012/016775 A1 | 2/2012 | | |
| WO | WO 2013/135405 A1 | 9/2013 | | |

* cited by examiner

DEVICE AND METHOD FOR RECALIBRATING AN EXHAUST GAS MASS FLOW SENSOR

CROSS REFERENCE TO PRIOR APPLICATIONS

This application is a U.S. National Phase application under 35 U.S.C. §371 of International Application No. PCT/EP2013/064975, filed on Jul. 16, 2013 and which claims benefit to German Patent Application No. 10 2012 108 350.9, filed on Sep. 7, 2012. The International Application was published in German on Mar. 13, 2014 as WO 2014/037138 A1 under PCT Article 21(2).

FIELD

The present invention relates to a method for recalibrating an exhaust gas mass flow sensor which includes a first sensor unit comprising a heating element and at least one temperature measuring element, a second sensor unit comprising a temperature measuring element, and a control unit by means of which a controlled temperature signal is adapted to be generated at the heating element, wherein, in the control unit, a first characteristic map is stored in which an exhaust gas mass flow is plotted as a function of a heat dissipation of the heating element. The present invention also relates to a method for recalibrating an exhaust gas mass flow sensor where, prior to installation of the exhaust gas mass flow sensor, a first characteristic map is generated in which an exhaust gas mass flow is plotted as a function of a heat dissipation of the heating element of the first sensor unit.

BACKGROUND

Gas mass flow meters are primarily known from the field of intake air mass flow measurements in internal combustion engines. Particularly good results are achieved with air mass flow meters which operate according to the principle of hot-film anemometry. This means that a heating element of the sensor is heated, wherein the generated heat of the heating element is transferred by convection to the flowing medium. The resultant temperature change of the heating element or the additional power input for maintaining the heating element temperature define a measure of the existing mass flow.

Modified mass flow sensors have in recent years also been used to measure the exhaust gas flow, as is described, for example, in DE 10 2006 058 425 A1. This device for determining the mass flow comprises two separate sensor units, wherein a first unit serves to calculate the mass flow by determining a power loss and/or a heat dissipation, and the second unit serves to determine the temperature of the exhaust gas flow. The heating element of the first sensor unit is then either controlled to an excess temperature having a constant difference to the temperature measuring element, or to a constant excess temperature. The exhaust gas mass flow can be deduced from the additional power input required for this purpose.

To prevent false measurements caused by deposits, the two sensor units comprise heating elements which can burn off contaminations at the substrates. Besides the problem of contamination in the exhaust gas line during use, there is the problem of obtaining representative measuring results in the case of pulsations and turbulences which occur to an increasing extent in the exhaust gas line. DE 10 2006 058 425 A1 therefore describes arranging two temperature measuring elements, one behind the other, which allows the recognition of the direction on the basis of the existing heat radiation from the upstream to the downstream region, which may be included in the calculation of the exhaust gas mass flow.

False measurements occur to an increasing extent during operation despite these possibilities of recognizing direction and/or pulsation and burning off deposits. A deposit at the sensor of the first sensor unit including the heating element has been identified as a cause of such false measurements, which deposit cannot be removed by being burning off, but which rather builds up on the chip due to the increased temperatures at unfavorable operating conditions, whereby inorganic compounds are produced on the surface when heating-up.

Methods for recalibrating the exhaust gas mass flow sensor during operation have therefore been created. WO 2007/075510 A1 describes a method of self-calibration of a sensor, wherein a power input of a heating element is first measured to maintain the heating element at an excess temperature relative to a temperature measuring element, a power input of the heating element is then measured while no flow exists, with the difference between the two power inputs being calculated. The heat transfer coefficient for determining the flow rate is corrected as a result. However, this method only takes into account a heat transfer by convection at the sensor account. A further, incorrect, measurement of the temperature difference due to different deposits built up at the sensor units is not taken into account.

SUMMARY

An aspect of the present invention is to provide a device and a method for recalibrating an exhaust gas mass flow sensor which allow a correct exhaust gas mass flow measurement to be made by eliminating faults.

In an embodiment, the present invention provides a device for recalibrating an exhaust gas mass flow sensor includes a first sensor unit, a second sensor unit, and a control unit. The first sensor unit comprises a first sensor unit heating element and at least one first sensor unit temperature measuring element. The second sensor unit comprises a second sensor unit temperature measuring element. The control unit is configured to control a temperature signal produced at the first sensor unit heating element. The control unit comprises a first characteristic map and a second characteristic map. In the first characteristic map, an exhaust gas mass flow is plotted as a function of a heat dissipation of the first sensor unit heating element. A correction factor can be determined from the second characteristic map based on the temperature signal produced at the first sensor unit heating element and measured by the at least one first sensor unit temperature measuring element and based on a temperature signal measured via the first sensor unit heating element at the second sensor unit temperature measuring element. The correction facture is used to correct a measured heat dissipation of the first sensor unit heating element to a corrected exhaust gas mass flow.

BRIEF DESCRIPTION OF THE DRAWINGS

The present invention is described in greater detail below on the basis of embodiments and of the drawings in which.

DETAILED DESCRIPTION

Figure 1:
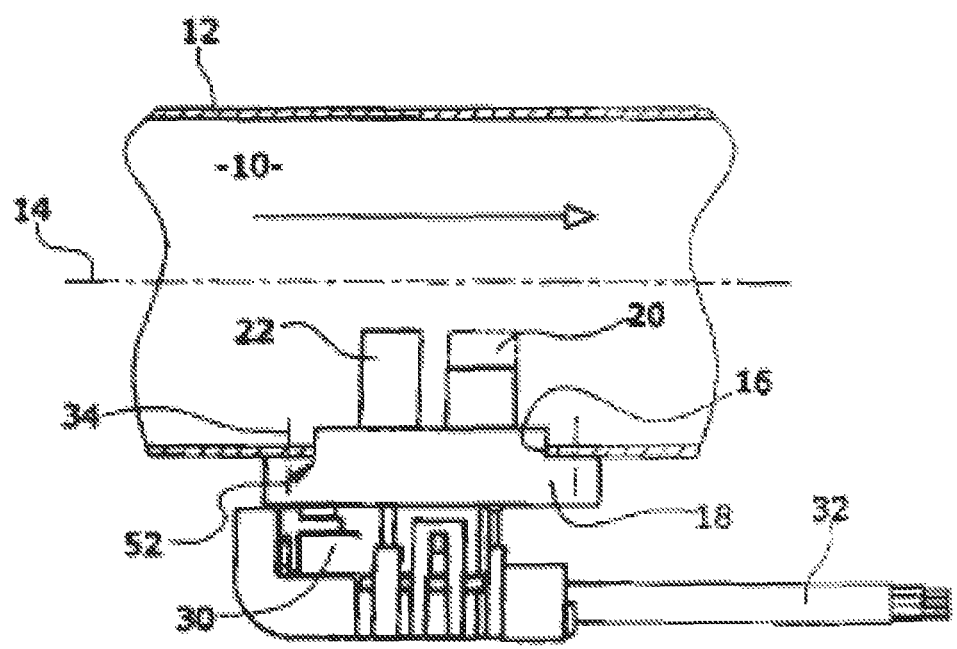
FIG. 1 shows a schematic side view of an exhaust gas mass flow sensor in a duct.
Figure 2:
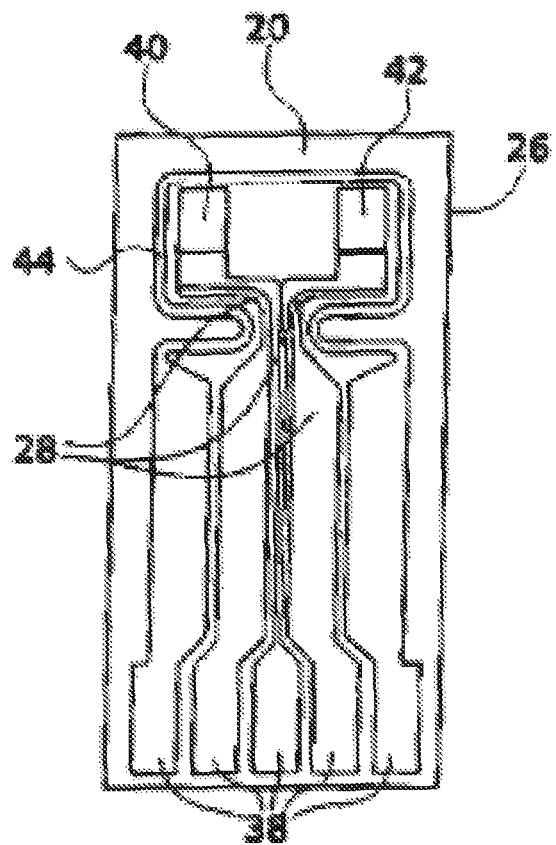
FIG. 2 shows a schematic top view of the first sensor unit of the exhaust gas mass flow sensor.

Because a second characteristic map is stored in the control unit, in which, from the temperature signal generated at the heating element and determined by means of the temperature measuring element of the first sensor unit and a temperature signal to be measured via the heating element at the temperature measuring element, a correction factor can be determined, with the aid of which the measured heat dissipation of the heating element can be converted into a corrected exhaust gas mass flow, both a change with regard to convection and the heat radiation are considered in the determination process. Different deposits are reflected by a change in the measured absolute temperature and delays so that, in the case of a complete characteristic map, exactly one state of the sensor units can be associated with each generated temperature signal and measured temperature signal. For different degrees of contamination of the sensor units, a reaction temperature profile is accordingly measured at the temperature measuring element of the second sensor unit relative to a temperature profile generated at the heating element and determined by means of the temperature measuring element of the first sensor unit, wherein a correction factor is generated from the reaction temperature profile and stored as a second characteristic map in the control unit, the correction factor serving to correct, during operation, the exhaust gas mass flow calculated with the aid of the first characteristic map. This recalibration is suitable for determining largely faultless exhaust gas mass flows even in the case of different deposits built up at the sensor units.

In an embodiment of the present invention, a heating element can, for example, be arranged at the first and the second sensor unit which allows soot deposits to be removed by being burnt off. It is thereby provided that a quick measurement for engine control purposes is maintained since, in the case of excessively thick layers built up at the substrates, a time delay is prevented, which would ultimately result in a failure of the sensor. Prior to recalibration, the two sensor units are accordingly cleaned by burning-off with the aid of the heating wires to prevent faults during recalibration.

In an embodiment of the method according to the present invention, the respective correction factor to be used during operation can, for example, be determined in a controlled stationary state of an internal combustion engine by generating the temperature profile at the heating element and measuring the reaction temperature profile at the temperature measuring element. The measurement taken in a controlled stationary state helps to prevent faults caused by flow changes at the sensor during recalibration.

Particularly good results are achieved when the controlled state is the state in which the internal combustion engine has not been started so that no flow exists and the reaction temperature profile depends exclusively on the heat conduction, radiation, and natural convection between the sensor units. Very accurate characteristic maps for recalibration purposes can thus be generated and used during operation.

In an embodiment of the present invention, a method can, for example, be employed wherein, with respect to different degrees of contamination of the two sensor units, at least two reaction temperature profiles are measured at the temperature measuring element of the second sensor unit relative to at least two different temperature profiles generated at the heating element, wherein, on the basis of the change in the reaction temperature profiles and the difference of the reaction temperature profiles, a correction factor is generated and stored as a second characteristic map in the control unit, the correction factor serving to correct, during operation, the exhaust gas mass flow calculated with the aid of the first characteristic map. It is thus provided that even a completely different deposit buildup on the two sensor units is detected since time delays and different amplitudes or even gradients can also be evaluated so that the calculated exhaust gas mass flow may also be corrected as a function of the deposit buildup.

Prior to installation of the exhaust gas mass flow sensor, the first characteristic map can, for example, be generated and stored in the sensor unit in which first characteristic map, the exhaust gas mass flow, is plotted as a function of a heat dissipation of the heating element of the first sensor unit and as a function of the correction factor, and the correction factor is extracted from the second characteristic map as a function of the reaction temperature signal measured last.

A device and a method for recalibrating an exhaust gas mass flow sensor are thus provided which allow for a correct calculation of the exhaust gas mass flow independent of any deposits built up over the entire service life of the sensor by determining the influence of the deposits of the sensor units on the calculation of a correction factor by evaluating a reaction temperature profile and continuously carrying out new calibrations of the first sensor unit.

An exemplary embodiment of a device for recalibrating an exhaust gas mass flow sensor according to the present invention is illustrated in the drawings and is described hereinafter together with the method for recalibration according to the present invention.

The exhaust gas mass flow sensor illustrated in FIG. 1 is arranged in a duct 10 through which exhaust gas flows and which is defined by walls 12. In the wall 12, an opening 16 is defined which extends perpendicularly to a duct axis 14 and through which a housing 18 of the exhaust gas mass flow sensor extends into the duct 10.

From the housing 18, a first sensor unit 20 and a second sensor unit 22 project into the duct 10, said sensor units 20,22 being defined by mostly multilayered ceramic substrates 24, 26 on which thin-film resistors of platinum and conductor paths 28 are arranged in a known manner.

The sensor units 20, 22 are normally arranged one behind the other and in parallel to each other in the main flow direction of the exhaust gas, wherein the main extension direction of each sensor unit 20, 22 is also parallel to the main flow direction in the duct 10. Since the connecting line of the sensor units 20, 22 extends in parallel to the main flow direction of the exhaust gas, said sensor units 20, 22 are not subjected to frontal onflow, but the flow merely passes over them, whereby deposits at the carrier body are considerably reduced.

The device operates in a known manner according to the principle of hot-film anemometry and comprises, besides the two sensor units 20, 22, a plug part 30 at the housing 18 end opposite to the sensor units 20, 22, from which plug part 30 a connecting cable 32 for voltage supply and data transmission to a control unit 52 extends. The control unit 52 may alternatively be arranged in the housing 18 or integrated in the motor control. The housing 18 is fastened via a flanged connection 34.

Figure 3:
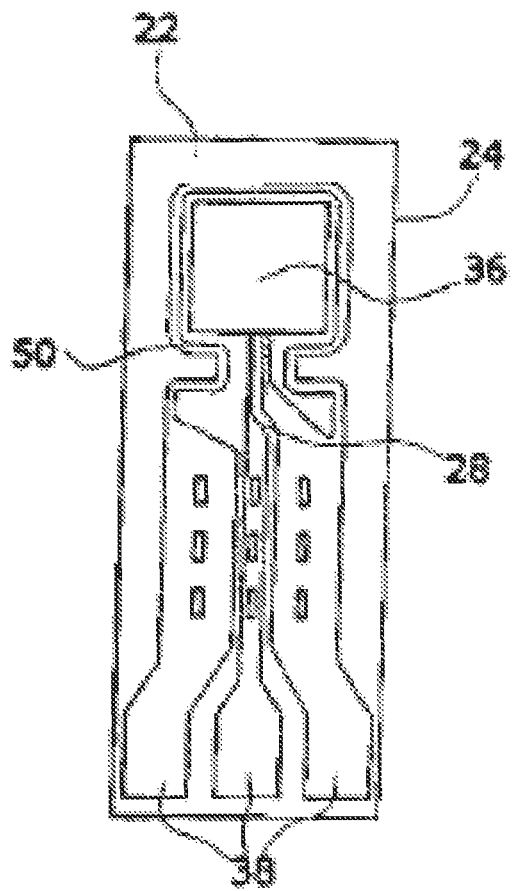
FIG. 3 shows a schematic top view of the second sensor unit of the exhaust gas mass flow sensor.

The second sensor unit 22 illustrated in FIG. 3 constitutes a temperature sensor by means of which the respective exhaust gas temperature is measured. Said second sensor unit 22 is arranged upstream of the first sensor unit 20 for measuring an exhaust gas temperature which is largely unaffected by the heating-up of the first sensor unit 20 since, in the case of a reverse arrangement, the exhaust gas flow would also transport the heat generated at the first sensor unit 20 to the second sensor unit 22. The exhaust gas temperature is measured by a temperature measuring element 36 which may, for example, be composed of two thin-film resistors of platinum with different resistances. The temperature measuring element 36 is electrically connected with the control unit 52 via the conductor paths 28, contact tabs 38 and the connecting cable 32. During normal operation, the second sensor unit 22 measures the temperature of the gas flow to be measured. A heating element 50 is additionally arranged at the substrate 24, the heating element 50 having the shape of a omega to be capable of providing for a uniform temperature distribution at the substrate 24 for the purposes of burning off any contamination.

In the present exemplary embodiment, the downstream first sensor unit 20 comprises two temperature measuring elements 40, 42 at the substrate 26, which are connected, independent of each other, with the control unit 52 via conductor paths 28 and contact tabs 38. A heating element 44 is additionally arranged at the substrate 26, which, during operation of the internal combustion engine, is heated up either to a constant excess temperature or to a constant temperature difference relative to the temperature measuring element 36. The existing flow cools the heating element 44 so that the heating element 44 requires a continuous power input to maintain the controlled excess temperature. This power input and/or the heat dissipation are converted, as a function of the existing exhaust gas temperature measured via the second sensor unit 22, into an exhaust gas mass flow in the control unit 52 using a first stored characteristic map which, prior to installation of the sensor, is determined by tests for this sensor type in the engine to be measured.

The use of two temperature measuring elements 40, 42 at the substrate 26 serves to determine and take into account occurring exhaust gas pulsations, i.e., a temporary reversal of the direction of the exhaust gas flow as expected in the exhaust gas region of a reciprocating piston engine due to the intake and discharge movements. It is assumed that the respective downstream temperature measuring element 42 measures a higher temperature than the upstream temperature measuring element 40 since the heat of the upstream temperature measuring element 40 is transported by the exhaust gas flow towards the downstream temperature measuring element 42. When the flow is reversed, the heat is transported in the opposite direction so that it is either assumed that the respective upstream temperature measuring element 40 is representative of the exhaust gas flow flowing in the respective direction or a characteristic map is stored in which, for various flow conditions and temperatures of the two temperature measuring elements 40, 42, an exhaust gas mass flow including both available temperatures and the resultant power inputs is stored.

The heating element 44 of the first sensor unit 20 is also configured as an omega in order to uniformly heat the substrate 26.

Although it is possible to clean the surfaces of the sensor units 20, 22, in particular by burning off soot, a measuring fault nonetheless occurs with an increasing number of operating hours. This fault is attributable to a growing brownish deposit at the first sensor unit 20 building up due to permanent thermal stress which is inevitable during heating-up of the first sensor unit 20 to the excess temperature. Nearly insoluble layers of deposit made of various compounds build up which affect the normal measuring operation. The temperature sensor not operating at increased temperatures does not show such deposits.

According to the present invention, a second characteristic map is therefore stored in the control unit 52 which allows for a correction of the first characteristic map. This means that with the aid of a correction factor determined from the second characteristic map, the correct exhaust gas mass flow can be calculated and/or deduced from the measured heat dissipation and/or power input.

This is done by generating a temperature signal at the heating element 44, if possible during standstill of the internal combustion engine, i.e., a stationary state when no heat is dissipated by a flow. This temperature signal entails a reaction temperature profile at the temperature measuring element 36. This reaction temperature profile is produced by convection and heat radiation between the two sensor units 20, 22 and by heat conduction via the housing 18 of the exhaust gas mass flow sensor. Depending on the type of the deposits at the sensor units 20, 22, the reaction temperature profile, as compared with the transmitted temperature signal, is changed to a different extent with regard to the amplitude, the reaction time, and possibly the gradient of the temperature profile as a function of the deposits at the sensors. It is accordingly possible to determine one correction factor for various reaction temperature profiles and to store it as a second characteristic map in the control unit 52, wherein this correction factor is either determined by means of theoretical calculation processes or it is specifically determined by tests for the specific sensor type and measurements in the presence of different deposits at the sensor units 20, 22 prior to start-up.

An additional improvement of the accuracy of the measurements can be attained when not only one temperature signal, but two different temperature signals, are transmitted and their reaction temperature profiles are measured since in this case it can additionally be concluded at which sensor unit 20, 22 which type of deposit exists, provided that the second characteristic map is generated for specific different deposits at the two sensor units 20, 22.

The correction factor determined last is of course used for further measurements during operation.

To prevent a failure of the sensor units 20, 22 or too inaccurate measuring results during determination of the correction factor due to an excessively large deposit buildup, the two sensor units 20, 22 are first cleaned by burning off deposits with the aid of the heating elements 44, 50 prior to recalibration.

The illustrated device and the illustrated method allow correct measuring results of the exhaust gas mass flow to be obtained over a long operating time even in the presence of deposits on the surface of a sensor unit which cannot be burnt off, the measuring results being required for an optimum engine control to reduce harmful emissions and to reduce power consumption.

It is to be understood that the scope of the main claim is not limited to the illustrated exemplary embodiment. The function of the control unit of the exhaust gas mass flow sensor may, of course, also be performed by the motor control. Reference should also be had to the appended claims.

What is claimed is:
1. A device for recalibrating an exhaust gas mass flow sensor, the device comprising:
    a first sensor unit comprising a first sensor unit heating element and at least one first sensor unit temperature measuring element;

a second sensor unit comprising a second sensor unit temperature measuring element; and a control unit configured to control a temperature signal produced at the first sensor unit heating element, the control unit comprising, a first characteristic map in which an exhaust gas mass flow is plotted as a function of a heat dissipation of the first sensor unit heating element, and a second characteristic map from which a correction factor can be determined based on the temperature signal produced at the first sensor unit heating element and measured by the at least one first sensor unit temperature measuring element and based on a temperature signal measured via the first sensor unit heating element at the second sensor unit temperature measuring element, wherein, the correction facture is used to correct a measured heat dissipation of the first sensor unit heating element to a corrected exhaust gas mass flow.

2. The device as recited in claim 1, wherein the second sensor unit further comprises a second sensor unit heating element.

3. A method for recalibrating an exhaust gas mass flow sensor, the method comprising:

providing an exhaust gas mass flow sensor comprising:

a first sensor unit comprising a first sensor unit heating element and at least one first sensor unit temperature measuring element, a second sensor unit comprising a second sensor unit temperature measuring element, and a control unit configured to control a temperature signal produced at the first sensor unit heating element;

generating, prior to installing the exhaust gas mass flow sensor, a first characteristic map in which an exhaust gas mass flow is plotted as a function of a heat dissipation of the first sensor unit heating element;

storing the first characteristic map in the control unit;

measuring a reaction temperature profile for various degrees of contamination of the first sensor unit and the second sensor unit at the second sensor unit temperature measuring element relative to a temperature profile generated at the first sensor unit heating element and determined by the at least one first sensor unit temperature element;

generating a correction factor from the reaction temperature profile;

storing the correction factor as a second characteristic map in the control unit; and correcting the exhaust gas mass flow calculated during an operation of the exhaust gas mass flow sensor with first characteristic map and the correction factor.

4. The method as recited in claim 3, wherein the correction factor is generated during a controlled stationary state of an internal combustion engine by generating the temperature profile at the first sensor unit heating element and measuring a reaction temperature profile at the second sensor unit temperature measuring element.

5. The method as recited in claim 4, wherein the controlled stationary state is a state in which the internal combustion engine has not been started.

6. The method as recited in claim 3, wherein for different degrees of contamination of the first sensor unit and the second sensor unit, the method comprises, measuring at least two reaction temperature profiles for the different degrees of contamination of the first sensor unit and the second sensor unit at the second sensor unit temperature measuring element relative to at least two different temperature profiles generated at the first sensor unit heating element;

generating the correction value from a change in the at least two reaction temperature profiles and a difference of the at least two reaction temperature profiles;

storing the correction factor as the second characteristic map in the control unit; and correcting the exhaust gas mass flow calculated during the operation of the exhaust gas mass flow sensor with first characteristic map and the correction factor.

7. The method as recited in claim 3, wherein, the first characteristic map plots the exhaust gas flow as a function of a heat dissipation of the first sensor unit heating element and as a function of the correction factor, and the correction factor is respectively extracted from the second characteristic map as a function of a last measured reaction temperature signal.

8. The method as recited in claim 3, wherein, the second sensor unit further comprises a second sensor unit heating element, and the method further comprises, cleaning the first sensor unit by burning-free the first sensor unit with the first sensor unit heating element; and cleaning the second sensor unit by burning-free the second sensor unit with the second sensor unit heating element.

* * * * *